US010458569B2

United States Patent
Murata

(10) Patent No.: US 10,458,569 B2
(45) Date of Patent: Oct. 29, 2019

(54) POSITIONER

(71) Applicant: Azbil Corporation, Tokyo (JP)

(72) Inventor: Kouichiro Murata, Tokyo (JP)

(73) Assignee: Azbil Corporation, Tokyo (JP)

( * ) Notice: Subject to any disclaimer, the term of this patent is extended or adjusted under 35 U.S.C. 154(b) by 394 days.

(21) Appl. No.: 15/355,348

(22) Filed: Nov. 18, 2016

(65) Prior Publication Data

US 2017/0138505 A1 May 18, 2017

(30) Foreign Application Priority Data

Nov. 18, 2015 (JP) .................................. 2015-225620

(51) Int. Cl.
| | |
|---|---|
| *F16K 31/12* | (2006.01) |
| *F16K 37/00* | (2006.01) |
| *F16K 31/06* | (2006.01) |
| *F15B 5/00* | (2006.01) |
| *H01F 7/06* | (2006.01) |
| *H01F 7/122* | (2006.01) |
| *H01F 7/14* | (2006.01) |

(52) U.S. Cl.
CPC .......... *F16K 37/0041* (2013.01); *F15B 5/003* (2013.01); *F16K 31/0682* (2013.01); *F16K 31/12* (2013.01); *H01F 7/064* (2013.01); *H01F 7/122* (2013.01); *H01F 7/145* (2013.01)

(58) Field of Classification Search
CPC .. F16K 31/06; F16K 31/0682; F16K 31/0613; F16K 31/12; F16K 31/02
USPC ....................... 361/139–140, 152, 160, 170; 251/129.01–129.08
See application file for complete search history.

(56) References Cited

U.S. PATENT DOCUMENTS

| | | | | |
|---|---|---|---|---|
| 5,722,632 A | * | 3/1998 | Rader | .................... F02M 26/57 123/568.27 |
| 7,028,980 B2 | * | 4/2006 | Kokubu | .............. F16K 31/0613 251/129.15 |
| 7,192,005 B2 | * | 3/2007 | Denyer | ............... F16K 31/0613 137/625.64 |

(Continued)

FOREIGN PATENT DOCUMENTS

| | | |
|---|---|---|
| JP | 4 -185901 | 7/1992 |
| JP | 11-304033 | 11/1999 |
| JP | 2012-207756 A | 10/2012 |

OTHER PUBLICATIONS

Japanese Notice of Reasons for Refusal issued Jun. 18, 2019 in Japanese Application No. 2015-225620, citing documents AO-AP therein, 3 pages.

*Primary Examiner* — Tuan T Dinh

(74) *Attorney, Agent, or Firm* — Oblon, McClelland, Maier & Neustadt, L.L.P.

(57) ABSTRACT

The positioner having an air circuit including magnetism generating portions producing magnetism based on a current in accordance with a difference between a valve opening setpoint of a regulator valve and a measured value for the valve opening, to generate a pneumatic signal wherein the air pressure is adjusted based on the magnetism produced by the magnetism generating portions, where this pneumatic signal is supplied to an operating device of the regulator valve, where the magnetism generating portions are connected in parallel, and including a plurality of coils connected through magnetically additive coupling.

4 Claims, 12 Drawing Sheets

(56) References Cited

U.S. PATENT DOCUMENTS

| | | | | |
|---|---|---|---|---|
| 8,100,142 B2* | 1/2012 | Sasago | ................ | F15B 13/0405 |
| | | | | 137/596.17 |
| 8,878,685 B2* | 11/2014 | Okuda | .................... | F16K 31/12 |
| | | | | 327/170 |
| 2005/0178333 A1* | 8/2005 | Loke | ..................... | C23C 16/325 |
| | | | | 118/723 ME |
| 2009/0201617 A1* | 8/2009 | Yamaguchi | .............. | H01H 9/40 |
| | | | | 361/93.9 |
| 2015/0051079 A1* | 2/2015 | Takahashi | ................. | H01F 6/06 |
| | | | | 505/163 |
| 2015/0248994 A1* | 9/2015 | Tandou | ............. | H01J 37/32724 |
| | | | | 156/345.52 |

* cited by examiner

POSITIONER

CROSS-REFERENCE TO RELATED APPLICATION

This application claims priority to Japanese Patent Application No. 2015-225620 filed Nov. 18, 2015. This application is incorporated herein by reference in its entirety.

TECHNICAL FIELD

The present disclosure relates to a positioner for controlling the valve opening of a regulator valve.

BACKGROUND

In chemical plants, and the like, positioners are used as devices for controlling valve openings of regulator valves used in process control of flow rates (see Japanese Unexamined Patent Application Publication No. 2012-207756). A positioner is that which controls the valve opening of a regulator valve by calculating a deviation between a valve opening setpoint for a regulator valve, sent from a higher-level device, and a measured valve opening value for the regulator valve, to supply, to an operating device, a control signal that is based on this deviation, to cause the regulator valve to open or close.

Typically, a positioner has a structure wherein a dislocation detector, such as an angle sensor or a magnetic sensor, for detecting the actual opening of a regulator valve as an amount of dislocation of a valve rod of the regulator valve, a controller, made from a microcontroller, or the like, for performing signal processing based on an output signal, or the like, from the dislocation detector, an electropneumatic converting portion, for converting the electrical signal, produced by the controller, into a pneumatic signal, and a flow rate amplifying portion (a pilot relay) for amplifying and supplying, to the operating device, the pneumatic signal generated by the electropneumatic converting portion, are enclosed in a case made from metal (see Japanese Unexamined Patent Application Publication No. 2012-207756).

SUMMARY

As described above, the positioner is an electrical device provided with electrical circuitry, such as the controller and the electropneumatic converting portion. Moreover, in chemical plants, or the like, it may be used in an explosive environment, filled with flammable gas. Because of this, an intrinsically safe anti-explosive structure is desirable.

As one condition for considering a positioner to have an intrinsically safe anti-explosive structure, the total amount of electrical energy that is stored in the electrical circuitry within the positioner must be kept to less than a prescribed value (Standard IEC60079-11).

Here the total amount of electrical energy is the sum of the electrical energies that are accumulated in the individual circuit elements that structure the electrical circuitry, where the electrical energies of the individual circuit elements are determined based on, primarily, the products of the circuit constants of the circuit elements (the inductances of the coils, the capacitances of the capacitors, and the like) and the maximum voltage in the electrical circuitry. Because of this, in order to reduce the total amount of energy in the electrical circuitry it is necessary to somehow reduce the circuit constants of the circuit elements that structure the electrical circuitry and the maximum voltage in the electrical circuitry.

On the other hand, in order to improve the stability of the operation of the electrical circuitry in the positioner (that is, the noise immunity, and the like), it is necessary to increase the circuit constants, such as the capacitances of the capacitors, and/or to increase the number of capacitors, and it is desirable for there to be a high degree of freedom in circuit design.

Given this, the inventor in the present application researched revising the structure of the electropneumatic converting portion of the positioner in order to secure freedom in the design of the electrical circuitry within the positioner while satisfying the condition of having an intrinsically safe anti-explosive structure. The result of this research was the discovery of the problems set forth below. These are explained in detail below.

FIG. 12 is a diagram illustrating the structure of an electropneumatic converting portion in a conventional positioner.

As illustrated in FIG. 12, the electropneumatic converting portion 52 of the positioner is structured from a nozzle 523, a flapper 522, a current generating circuit 520, and a magnetism generating portion 521 that is structured from a coil L0 and a core 525. In the electropneumatic converting portion 52, a flapper 522 on which a permanent magnet 524 is caused to swing through the current generating circuit 520 causing a change in the magnetic flux that is produced by the coil L0 and the core 525 through producing, in the coil, a current in accordance with a control signal from a controller. Through this, the distance between the flapper 522 and a jet opening 523B of the nozzle 523 is changed to change the pressure of a pneumatic signal that is discharged from the nozzle 523. This pneumatic signal has the flow rate thereof amplified by a flow rate amplifying portion (a pilot relay) that is provided in a later stage, to be supplied to an operating device for operating the regulator valve.

Moreover, as illustrated in FIG. 12, Zener diodes ZDa and ZDb, for over-voltage protection, in order to satisfy a condition for an intrinsically safe anti-explosive structure, are connected between the current generating circuit 520 and the coil L0.

As described above, the electropneumatic converting portion 52 changes the pressure of a pneumatic signal through applying an excitation current to the coil L0. When current flows in the coil L0, then, in the steady state, ideally the voltages at both ends of the coil L0 will be 0 V; however, in practice there will be a voltage drop due to the winding resistance (an equivalent series resistance) based on the resistance component of the windings in the coil L0. This voltage drop will be greater the greater the winding resistance in the coil L0.

When the voltage that is produced across the ends of the coil L0 is large, then the voltage that is applied to the Zener diodes ZDa and ZDb that are connected in parallel to the coil L0 will, in normal operation of the electropneumatic converting portion, become large. Because of this, in order to satisfy the conditions for an intrinsically safe anti-explosive structure, there is the need for a Zener diode with a larger Zener voltage, which will cause a larger accumulation of electrical energy at the time of a fault in the coil L0.

As stated above, in order to satisfy the conditions for an intrinsically safe anti-explosive structure, the total energy of the electrical circuitry must be kept below a prescribed value. Because of this, the increase in the maximum voltage in the electrical circuitry when a Zener diode with a larger Zener voltage is used means that the circuit constants of the other circuit elements, such as the capacitors, coils, and the like, must be reduced commensurately. That is, the increase in the voltage across the coil (the Zener diode) requires a reduction in the upper limit values of the circuit constants for the circuit elements other than the Zener diodes, reducing freedom in circuit design.

As described above, because an increase in the voltage across the coil in the electropneumatic converting portion is a drawback in respect to freedom in the intrinsically safe anti-explosive structure and circuit design, it is desirable to reduce the voltage across the coil, as described above.

Given this, the inventor in the present application researched reducing the voltage across the coil in the electropneumatic converting portion.

As described above, because the voltage across the coil is dependent on the winding resistance of the coil, it is necessary to reduce the winding resistance of the coil in order to reduce the voltage across the coil. One method that can be considered for reducing the winding resistance of the coil is to have the windings in the coil be fatter.

However, this method causes the size of the coil to be large. In particular, because the coil for structuring the magnetism generating portion in an electropneumatic converting portion is large when compared to other components that are arranged within the positioner, an increase in the size of the coil leads to an increase in the size of the positioner, which is problematic in that this produces drawbacks in terms of the explosive-proof structure of the positioner, and in terms of manufacturing costs.

The present disclosure was created in contemplation of the problem described above, and the object of the present disclosure is to increase the freedom of design for the electrical circuitry within the positioner while satisfying conditions for an intrinsically safe anti-explosive structure.

The positioner (1) according to the present disclosure has an air circuit (11) that includes magnetism generating portions (121, 221, and 321) for producing magnetism based on a current in accordance with a difference between a valve opening setpoint (SP) of a regulator valve (3) that is subject to control and a measured value (PV) for the valve opening of the regulator valve, to generate a pneumatic signal (So) wherein the air pressure is adjusted based on the magnetism that is produced by the magnetism generating portions, where this pneumatic signal (So) is supplied to an operating device (2) of the regulator valve, where the magnetism generating portions are connected electrically in parallel, where a plurality of coils (L1 and L2) that are connected through magnetically additive coupling are included.

In the positioner set forth above, the magnetism generating portion (121) may further include a core (125) through which a plurality of coils passes, where the plurality of coils may be mutually separated in the direction in which the core extends.

In the positioner described above, the plurality of coils that structure the magnetism generating portion (221) may be disposed in the form of concentric circles.

In the positioner described above, the magnetism generating portions may further include main interconnections (LP and LN) to which current is supplied, a plurality of branch interconnections (Lp1, Ln1, Lp2, and Ln2) that branch from the main interconnections, provided for each of the plurality of coils, and a plurality of Zener diodes (ZD1, ZD2, ZD3, and ZD4), which are provided for each of the plurality of coils, and corresponding coils and Zener diodes may be connected in parallel to the respective branch interconnections.

Note that in the explanation set forth above, reference symbols in the drawings, corresponding to the structural elements of the element, are annotated within the parentheses.

As explained above, the present disclosure enables an increase in the freedom of design of the electrical circuitry within the positioner while satisfying the conditions for an intrinsically safe anti-explosive structure in a positioner.

BRIEF DESCRIPTIONS OF THE DRAWINGS

DETAILED DESCRIPTION

Forms for carrying out the present invention will be explained below in reference to the figures.

Figure 1:
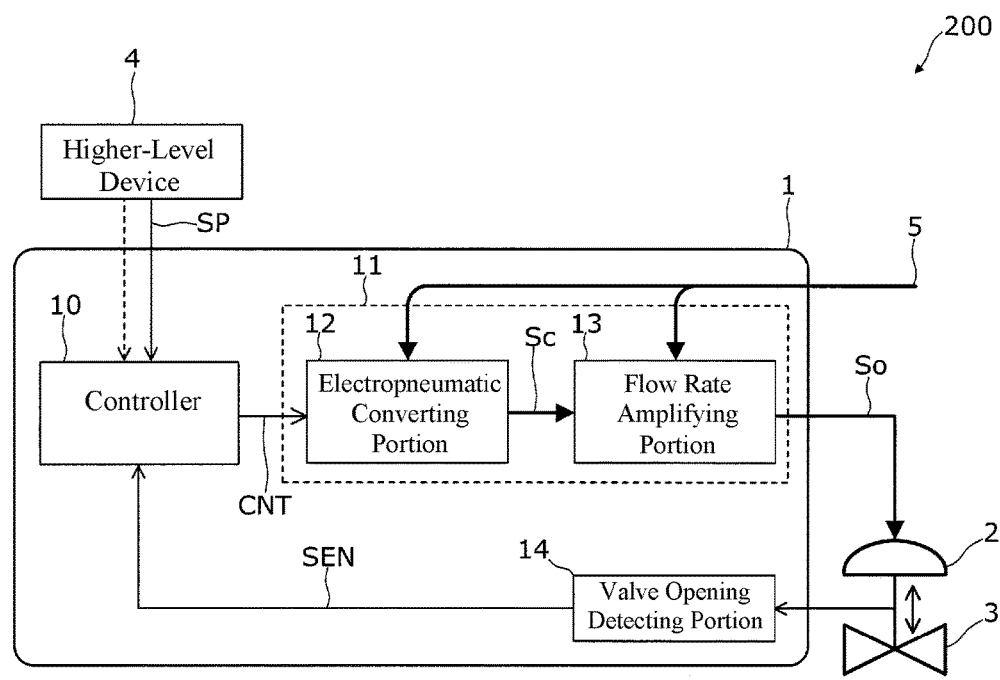
FIG. 1 is a diagram illustrating the structure of a valve controlling system included in a positioner according to an example.

FIG. 1 is a diagram illustrating the structure of a valve controlling system included in a positioner according to an example of the present disclosure.

The valve controlling system 200 illustrated in FIG. 1 is provided with a regulator valve 3, an operating device 2, a higher-level device 4, and a positioner 1.

The regulator valve (valve) 3 is a device for controlling the flow of a fluid from one flow path to another flow path, and may be, for example, a pneumatic regulator valve. The operating device 2 is, for example, a pneumatic valve actuator, for controlling the opening/closing of the regulator valve 3 through operating a valve rod of the regulator valve 3 in accordance with an output pneumatic signal So that is supplied from the positioner 1, described below. Note that the operating device 2 may be a double-action operating device that has a structure wherein a manipulated variable of a valve rod of the regulator valve 3 is determined in accordance with a pressure differential between two outputted pneumatic signals, or may be a single-action operating device that has a structure wherein the manipulated variable of the valve rod of the regulator valve 3 is determined in response to a single outputted pneumatic signal; there is no particular limitation on the type of operating device 2.

The higher-level device 4 is a device on the higher-level side for issuing commands to the positioner 1 for opening/closing the regulator valve 3, and applies, to the positioner 1, a setpoint SP for the valve opening of the regulator valve 3.

The positioner 1 is a device for controlling the opening/closing of the regulator valve 3 through operating the operating device 2. Specifically, the positioner 1 calculates the difference between the valve opening setpoint SP of the regulator valve 3, applied by the higher-level device 4, and the measured valve opening value PV of the regulator valve 3, and generates, and applies to the operating device 2, an output pneumatic signal So in accordance with that difference, to control the valve opening of the regulator valve 3.

A specific structure of the positioner 1 will be described below.

As illustrated in FIG. 1, the positioner 1 is provided with functional portions such as a controller 10, an air circuit 11, a valve opening detecting portion 14, and the like. These functional portions are contained within a case that is made of, for example, a metal material. Note that the positioner 1 may have a displaying portion (for example, a liquid crystal display), or the like, for providing, to the user, various types of information regarding, for example, the valve opening of the regulator valve 3.

The valve opening detecting portion 14 is a dislocation detector for detecting the valve opening of the regulator valve 3 as an amount of dislocation of the valve rod of the regulator valve 3, to generate a detection signal SEN depending on the amount of dislocation. Angle sensors and magnetic sensors, and the like, can be listed as examples of valve opening detecting portions 14.

The controller 10 is an electronic circuit for carrying out various types of data processing regarding controlling of the valve opening of the regulator valve 3. For example, the controller 10 may be embodied through a program processing device such as a microcontroller (MCU) in which a CPU and various types of memory, such as a RAM and a ROM, are installed, various types of interface circuits for achieving signal inputs and outputs relative to the outside, and an A/D converting circuit for converting, into digital signals, various types of analog signals that are inputted from the outside, and for inputting them into the program processing device.

Specifically, the controller 10 calculates the measured value PV for the valve opening of the regulator valve 3 based on the detection signal SEN that is outputted by the valve opening detecting portion 14, and calculates the difference between the calculated measured valve opening value PV and the setpoint SP for the valve opening of the regulator valve 3, applied by the higher-level device 4. Moreover, the calculator 10 calculates, based on this difference, a manipulated variable (MV) for operating the operating device 2 so that the measured value PV for the valve opening will become equal to the setpoint SP, and outputs, as a control signal CNT, an electrical signal in accordance with the manipulated variable.

The air circuit 11 is a functional portion for converting the control signal CNT, which is the electrical signal generated by the controller 10, into a pneumatic signal. Specifically, the air circuit 11 includes a magnetism generating portion for generating magnetism based on an electric current in accordance with the control signal CNT, to generate an output pneumatic signal So wherein the air pressure is adjusted in accordance with the magnetism generated by the magnetism generating portion.

More specifically, as illustrated in FIG. 1, the air circuit 11 is structured from an electropneumatic converting portion 12 and flow rate amplifying portion 13.

The electropneumatic converting portion 12 changes, in accordance with the control signal CNT, the pressure Ps of the air 5 that is supplied to the positioner 1 from an air pressure supply source (not shown), such as a pressure-reducing valve, or the like, that is provided outside of the positioner 1 (where this air pressure is termed the "supply air pressure", below), to generate a pneumatic signal Sc for a pressure Pn in accordance with the control signal CNT. Note that the details of the electropneumatic converting portion 12 will be set forth below.

The flow rate amplifying portion 13 is a functional portion for generating the output pneumatic signal So for driving the operating device 2 through amplifying the pneumatic signal Sc that is generated by the electropneumatic converting portion 12. The flow rate amplifying portion 13 is a well-known pilot relay, and generates an output pneumatic signal So through regulating the air 5 of the supply air pressure Ps in accordance with the pressure Pn of the pneumatic signal Sc that is outputted from the electropneumatic converting portion 12. For example, if the flow rate amplifying portion 13 is a single-action pilot relay, then it generates, and supplies to the operating device 2, a single pneumatic signal as the output pneumatic signal So, and if the flow rate amplifying portion 13 is a double-action pilot relay, it generates, and supplies to the operating device 2, two pneumatic signals as the output pneumatic signal So.

The details of the electropneumatic converting portion 12 according to the present example will be explained here.

Figure 2:
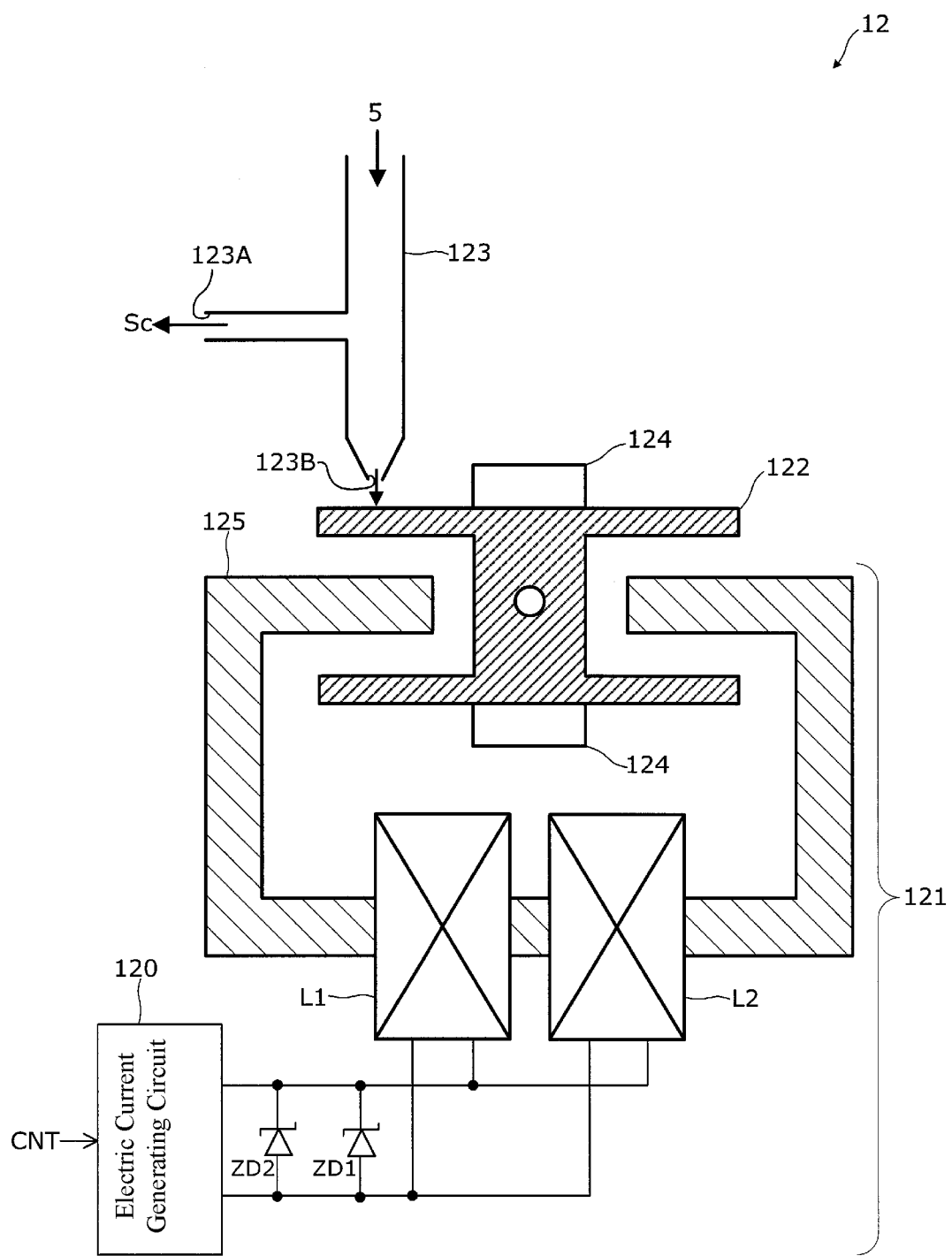
FIG. 2 is a diagram illustrating schematically the structure of an electropneumatic converting portion in a positioner according to the example.

FIG. 2 is a diagram illustrating schematically the structure of the electropneumatic converting portion in the positioner according to the first example.

As illustrated in FIG. 2, the electropneumatic converting portion 12 differs from the electropneumatic converting portion of the conventional positioner in the point that the coil that structures the magnetism generating portion is divided into a plurality of coils.

Specifically, the electropneumatic converting portion 12 is provided with a magnetism generating portion 121, a flapper 122, and a nozzle 123.

The magnetism generating portion 121 is a functional portion for generating a magnetic field based on an electric current (an excitation current) in accordance with the control signal CNT. Specifically, the magnetism generating portion 121 includes a current generating circuit 120 for generating a current in accordance with the control signal CNT, coils L1 and L2 for generating a magnetic field in accordance with the current that is supplied from a current generating circuit 120, a core 125 that is disposed passing through the center part of the coils L1 and L2 in the axial direction of the coils L1 and L2, and Zener diodes ZD1 and ZD2.

The Zener diodes ZD1 and ZD2 are elements necessary for the positioner 1 to satisfy the conditions for an intrinsically safe anti-explosive structure, being protective elements for absorbing energy released by the coils L1 and L2 to regulate the maximum voltage of the electropneumatic converting portion 12. The Zener diodes ZD1 and ZD2 are connected in parallel with the coils L1 and L2 to the signal line that supplies the excitation current to the coils L1 and L2 from the current generating circuit 120.

The number of Zener diodes that are connected in parallel with the coils L1 and L2 is determined in accordance with the requirements for the intrinsically safe anti-explosive structure. In the present example, a case wherein two Zener diodes ZD1 and ZD2 are provided is presented as an example, as illustrated in FIG. 2, but the number of Zener diodes is not limited thereto.

The flapper 122 is a functional portion for changing the pressure of the pneumatic signal Sc that is outputted from the nozzle 123, described above, in accordance with a change in the magnetic field from the magnetism generating portion 121. Specifically, a permanent magnet 124 is attached to the flapper 122, and the permanent magnet 124, the coils L1 and L2, and the core 125 structure a magnetic circuit. The magnetic flux within this magnetic circuit is changed in order to rotate the flapper 122.

The nozzle 123 is a functional portion for expelling, from an exhaust outlet 123A, a pneumatic signal Sc wherein the pressure is adjusted through the rate of expulsion of air 5 being controlled by the flapper 122, where this air 5, of a supply air pressure Ps is supplied through, for example, a fixed constriction. The pressure Pn of the pneumatic signal Sc will be termed the "nozzle back pressure Pn" in the below.

The operation of the electropneumatic converting portion 12 will be explained briefly here.

Figure 3:
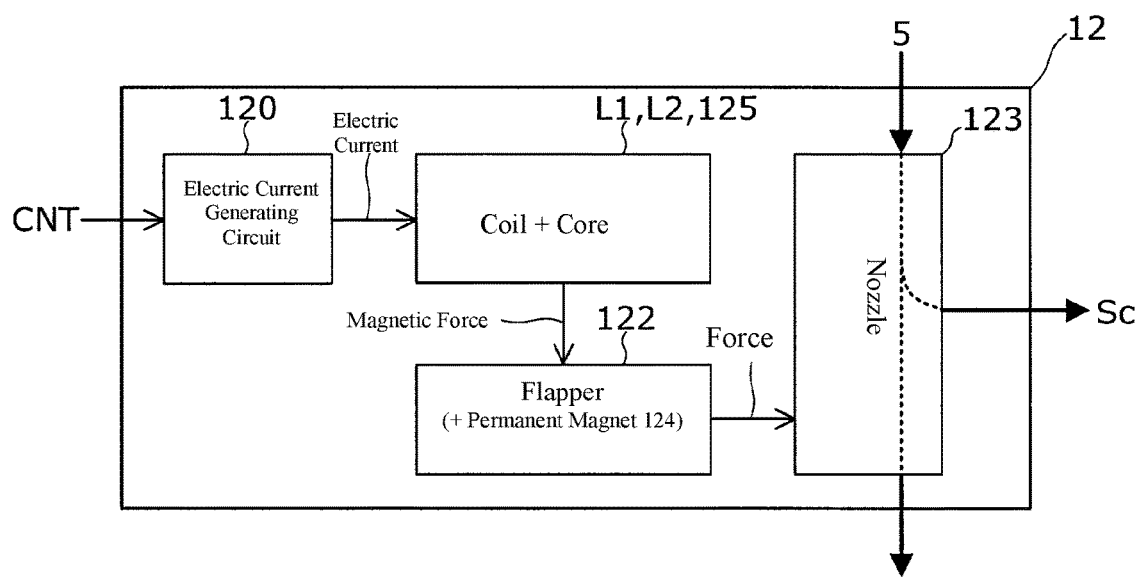
FIG. 3 is a diagram illustrating the relationships between the various functional blocks that structure the electropneumatic converting portion in the positioner according to the example.

FIG. 3 is a diagram illustrating the relationships between the various functional blocks that structure the electropneumatic converting portion 129.

As illustrated in FIG. 3, when a control signal CNT is supplied to the current generating circuit 120, the current generating circuit 120 generates an electric current (an excitation current) in accordance with the control signal CNT, and supplies it to the coils L1 and L2. The coils L1 and L2, and the core 125, produce a magnetic field in accordance with the electric current that is supplied to the coils L1 and L2. Through this, the magnetic field between the coils L1 and L2 and the core 125, and the permanent magnet 124, is varied to produce a rotational force in the flapper 122.

Figure 4:
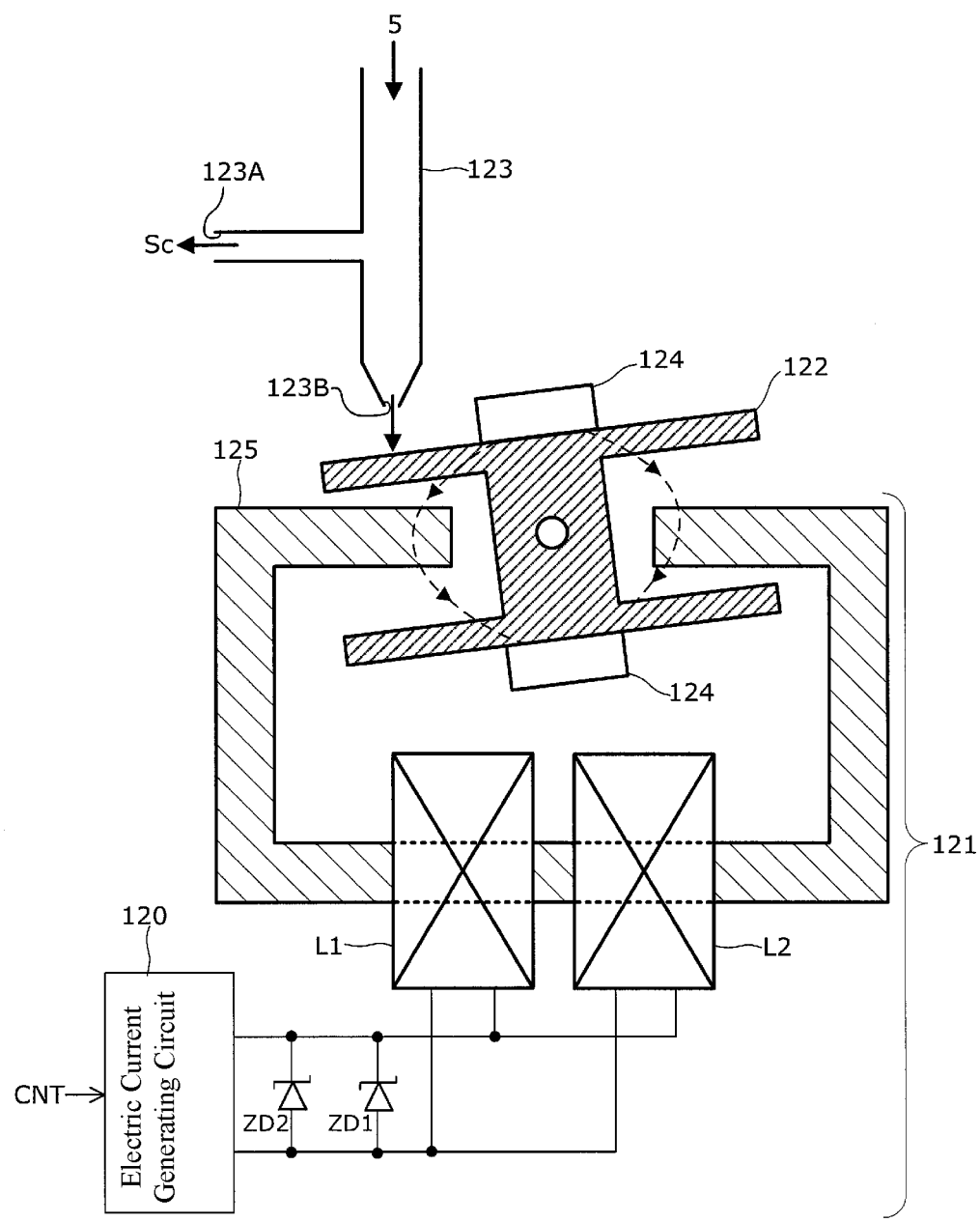
FIG. 4 is a diagram for explaining the operation of the electropneumatic converting portion.
Figure 5:
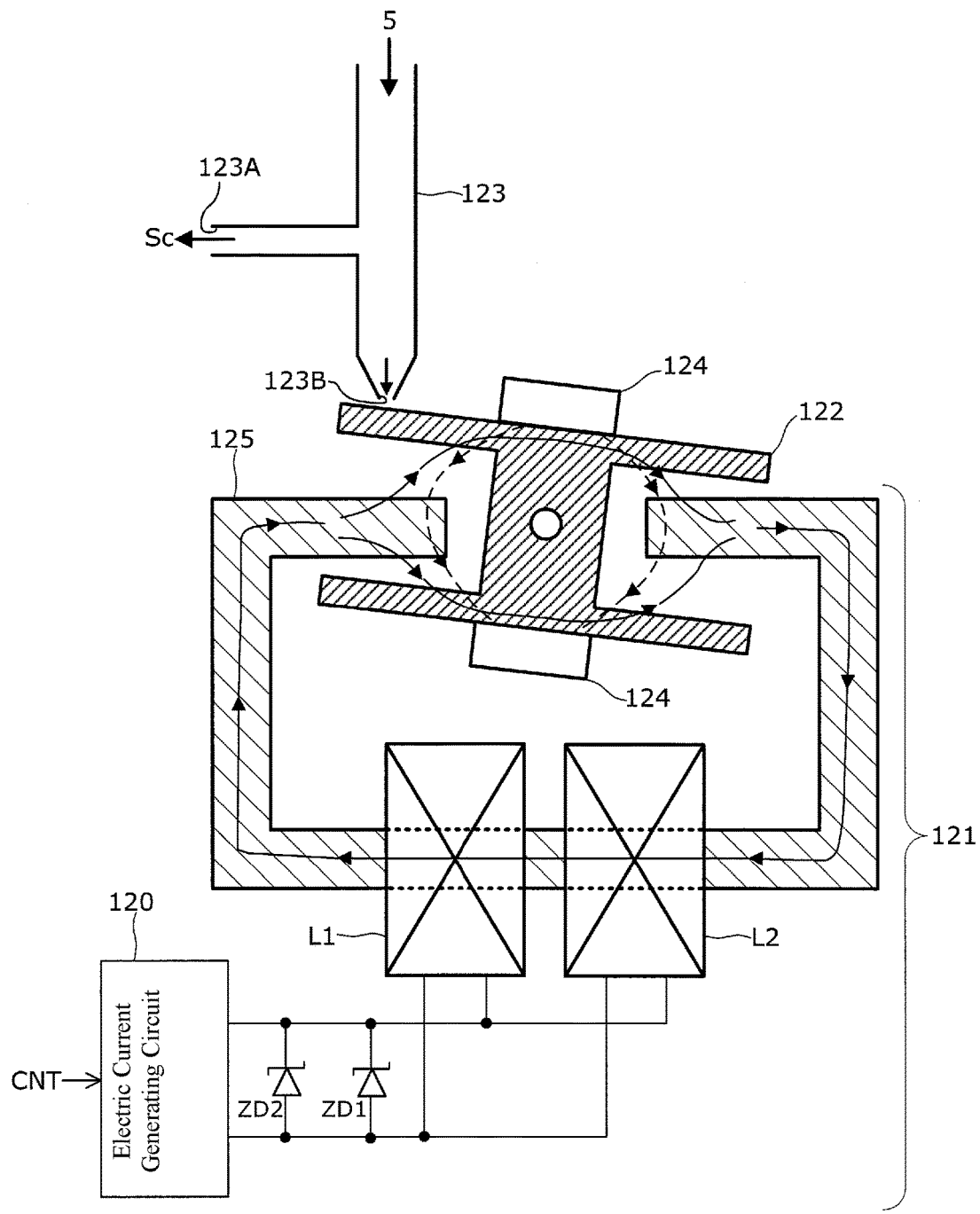
FIG. 5 is a diagram for explaining the operation of the electropneumatic converting portion.

When the flapper 122 rotates, the distance between the flapper 122 and the jet opening 123B of the nozzle 123 changes, causing a change in the jet flow rate of the air from the jet opening 123B of the nozzle. For example, as illustrated in FIG. 4, when no excitation current flows in the coils L1 and L2, the distance between the flapper 122 and the jet opening 123B of the nozzle 123 will be large, and when an excitation current flows in the coils L1 and L2, as illustrated in FIG. 5, the distance between the flapper 122 and the jet opening 123B of the nozzle 123 will be short. In this way, the distance between the flapper 122 and the jet opening 123B of the nozzle 123 can be varied to vary the nozzle back pressure Pn of the pneumatic signal Sc that is outputted from the exhaust outlet 123A of the nozzle 123.

The details of the coils L1 and L2 will be explained next.

The coils L1 and L2 have a magnetically coupled relationship wherein the directions of the magnetic fluxes that are produced from the respective coils L1 and L2 when currents are applied to the coils L1 and L2 will be in identical directions. That is, the coil L1 and the coil L2 are additively coupled. Moreover, the coil L1 and the coil L2 are connected electrically in parallel.

Specifically, as illustrated in FIG. 2, a common core 125 passes through the coil L1 and the coil L2, and the coils L1 and L2 are disposed separately, separated in the direction in which the core 125 extends.

Through this, it is possible to increase the freedom in the design of the electrical circuitry within the positioner, while satisfying the conditions for an intrinsically safe anti-explosive structure, through using, in the magnetism generating portion 121 of the electropneumatic converting portion 12, coils L1 and L2 that are connected electrically in parallel and connected additively magnetically. The details will be explained below.

Figure 6:
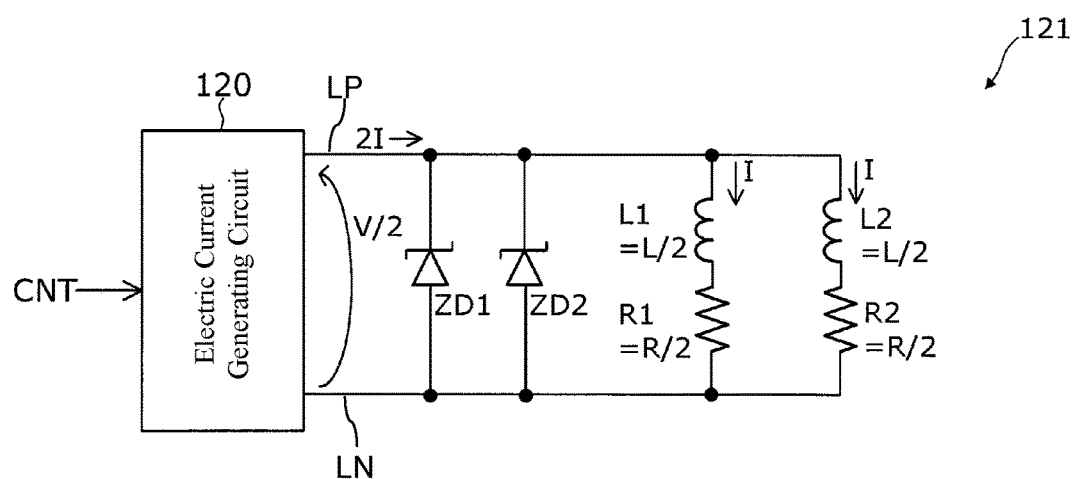
FIG. 6 is a diagram illustrating the electrical connection relationships of the individual coils in the electropneumatic converting portion in the positioner according to the example.

FIG. 6 is a diagram illustrating the electrical connection relationships between the coils L1 and L2 and the magnetism generating portion 121 of the electropneumatic converting portion 12 of the positioner 1 according to the present example.

Figure 7:
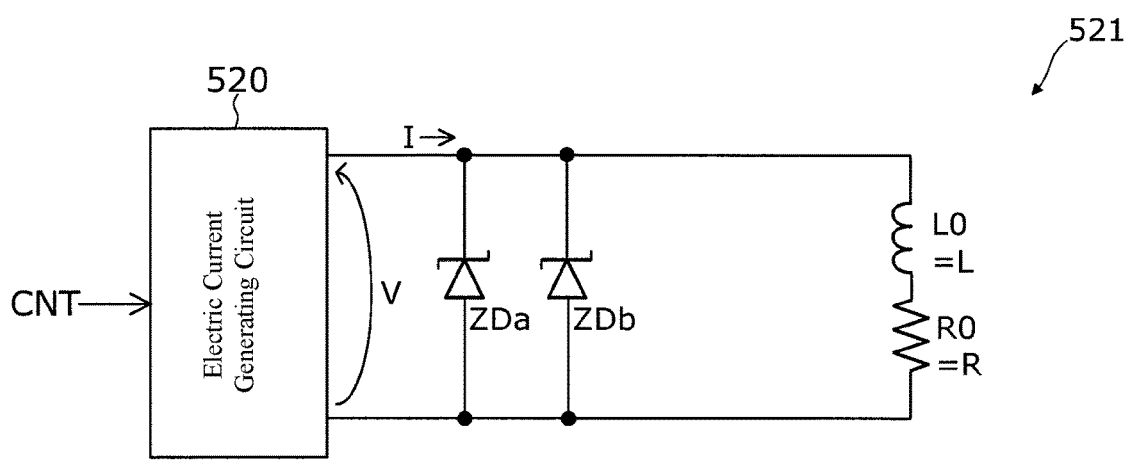
FIG. 7 is a diagram illustrating the electrical connection relationships of the coils in an electropneumatic converting portion in a conventional positioner.
Figure 12:
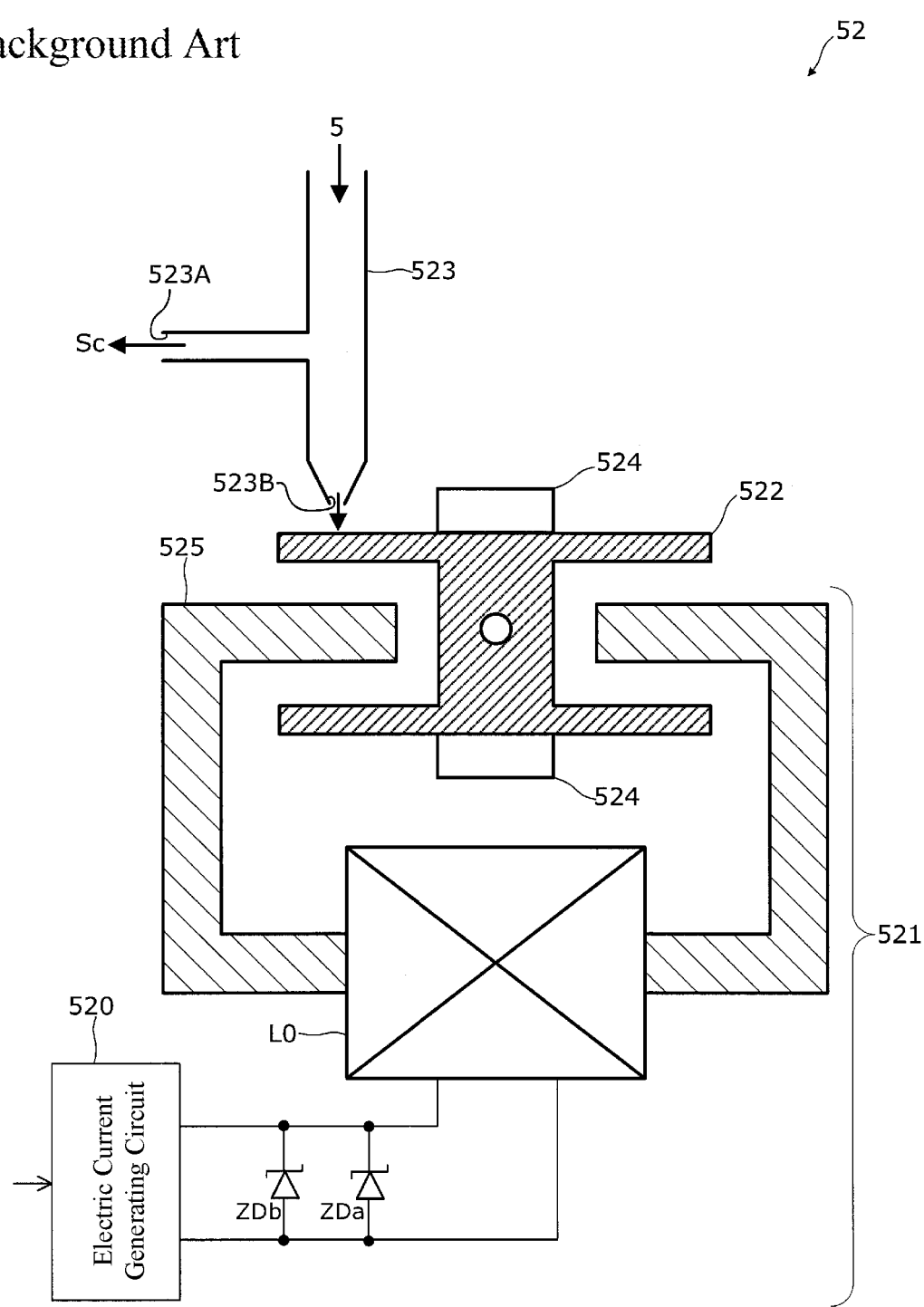
FIG. 12 is a diagram illustrating schematically the structure of an electropneumatic converting portion in a conventional positioner.

FIG. 7 is a diagram illustrating the electrical connection relationships of the coil L0 in the magnetism generating portion 521 of the electropneumatic converting portion 52 of the conventional positioner illustrated in FIG. 12.

As illustrated in FIG. 6, the coil L1 and the coil L2 that structure the electropneumatic converting portion 12 of the positioner 1 according to the present example are connected in parallel between two signal lines LP and LN that are supplied current from the current generating circuit 120.

Here the coils L1 and L2 have identical series resistances based on the resistance components of the windings of the individual coils, as described above. Consequently, in FIG. 6 the winding resistances R1 and R2, as the respective equivalent series resistances of the coils L1 and L2, are connected in series, respectively, to the coils L1 and L2.

Moreover, as illustrated in FIG. 6, the Zener diodes ZD1 and ZD2 are connected in parallel to the coils L1 and L2 to the signal lines LP and LN.

In contrast, the magnetism generating portion 521 of the conventional electropneumatic converting portion 52, as illustrated in FIG. 7, is structured from a single coil L0, where the winding resistance R0 is connected in series with the coil L0. Moreover, Zener diodes ZDa and ZDb are connected in parallel with the coil L0.

Here, in the conventional magnetism generating portion 521, illustrated in FIG. 7, the magnetic flux $\varphi$, the voltages applied to the Zener diodes ZDa and ZDb, and the energy stored in the coil L0, are expressed as follows.

When a current I is supplied from the current generating circuit 520 to the coil L0, if the inductance of the coil L0 is defined as L, then the magnetic flux $\varphi$ that is produced by the coil L0 is expressed by "$\varphi = LI$". Moreover, the voltage V across the Zener diodes ZD1 and ZD2 is expressed by "$V = RI$," based on the resistance R0 that is the equivalent series resistance of the coil L0, and the current I. Moreover, the energy E0 that is stored in the coil L0 is expressed as "$E0 = LI^2/2$."

Consequently, in the conventional magnetism generating portion 521, the Zener diodes ZDa and ZDb that are connected in parallel with the coil L0 have a Zener voltage that is greater than "$V = RI$," and when the energy E0 is released from the coil L0 when there is a fault in the positioner, it is necessary that they have electric power ratings able to absorb that amount of energy E0 ($= LI^2/2$).

Let us consider the production of a magnetic flux $\varphi$ of the same magnitude as that of the magnetism generating portion 521 in FIG. 7 but in the magnetism generating portion 121 according to the present example, illustrated in FIG. 6.

In this case, when the number of windings in each of the coils L1 and L2 is half the number of windings of the coil L0, then the respective inductances in the coils L1 and L2 will be "$L/2$," and each of the equivalent direct line resistances will also be $R1 = R2 = R/2$. In this case, when a current of 2I is applied to the coil side from the current generating circuit 120, then the current flowing in each of the coils L1 and L2 will each be "I."

In this case, the magnetic fluxes φ1 and φp2 produced by the respective coils L1 and L2 will each be "φ1=φ2=LI/2." As described above, the coil L1 and the coil L2 are additively coupled, and thus the magnetic flux φ that is produced by the magnetism generating portion 121 will be that wherein the magnetic fluxes of both of the coils L1 and L2 are superimposed, expressed by "φ=φ1+φ2=LI/2+LI/2=LI.

Moreover, the voltage V across each of the Zener diodes ZD1 and ZD2 is determined by the resistances R1 and R2, which are the equivalent series resistances of the coils L1 and L2, and the currents that flow in the respective resistances R1 and R2, and is expressed by "V=RI/2." Moreover, the total energy E that is stored in the coils L1 and L2 is expressed by "E=½×LI$^2$/2+½×LI$^2$/2=LI$^2$/2."

Consequently, the Zener diodes ZD1 and ZD2 that are connected to the magnetism generating portion 121 according to the example must have Zener voltages larger than "V=RI/2," and must have electric power ratings able to absorb the amount of energy E0 (=LI$^2$/2) when the energy E0 is released from the coil the L0 when there is a fault in the positioner.

From the above, when the same magnetic flux φ is produced by the conventional magnetism generating portion 521 and the magnetism generating portion 121 according to the present disclosure, the voltage across the coils that structure the magnetism generating portion can be understood to be smaller for the magnetism generating portion 121 according to the present disclosure.

The positioner 1 according to the present disclosure is able to reduce the voltage that is produced across each of the coils L1 and L2 when electric currents flow in the coils L1 and L2 because the equivalent series resistances (R1 and R2) of the coils L1 and L2 that structure the magnetism generating portion of the electropneumatic converting portion are small when compared to that of the conventional positioner because the coil that structures the magnetism generating portion of the electropneumatic converting portion is divided plurally.

This makes it possible to reduce the maximum voltage of the electrical circuitry that structure the electropneumatic converting portion, through the ability to use, as Zener diodes ZD1 and ZD2, elements with lower Zener voltages, because the voltages that are applied to the Zener diodes ZD1 and ZD2 that are connected in parallel to the coils L1 and L2 are less than that which is conventional. This enables an increase in the values allowed for the circuit constants of the circuit elements that structure the electropneumatic converting portion for satisfying the conditions of the intrinsically safe anti-explosive structure.

That is, the positioner 1 according to the present example increases the freedom of the design of the electrical circuitry, beyond that in the conventional positioner, through the ability to increase the circuit constants, such as the capacitances of the capacitors and the inductances of the coils, in the electrical circuitry within the positioner 1 while satisfying the conditions for the intrinsically safe anti-explosive structure.

Moreover, given the positioner according to the present example, the positioner can be miniaturized due to the increase in the freedom of the layout of the coils within the case of the positioner 1 through dividing the coils into a plurality of coils. Furthermore, because the equivalent series resistance of the coils is reduced from that which is conventional, there is no need for the windings in the coils to be fatter, thus making it possible to avoid an increase in size of the positioner due to an increase in size of the coil. That is, the positioner 1 according to the present example enables the positioner to be miniaturized, thus facilitating ease in satisfying the conditions for an explosive proof structure, and enables the manufacturing costs to be controlled.

Figure 8:
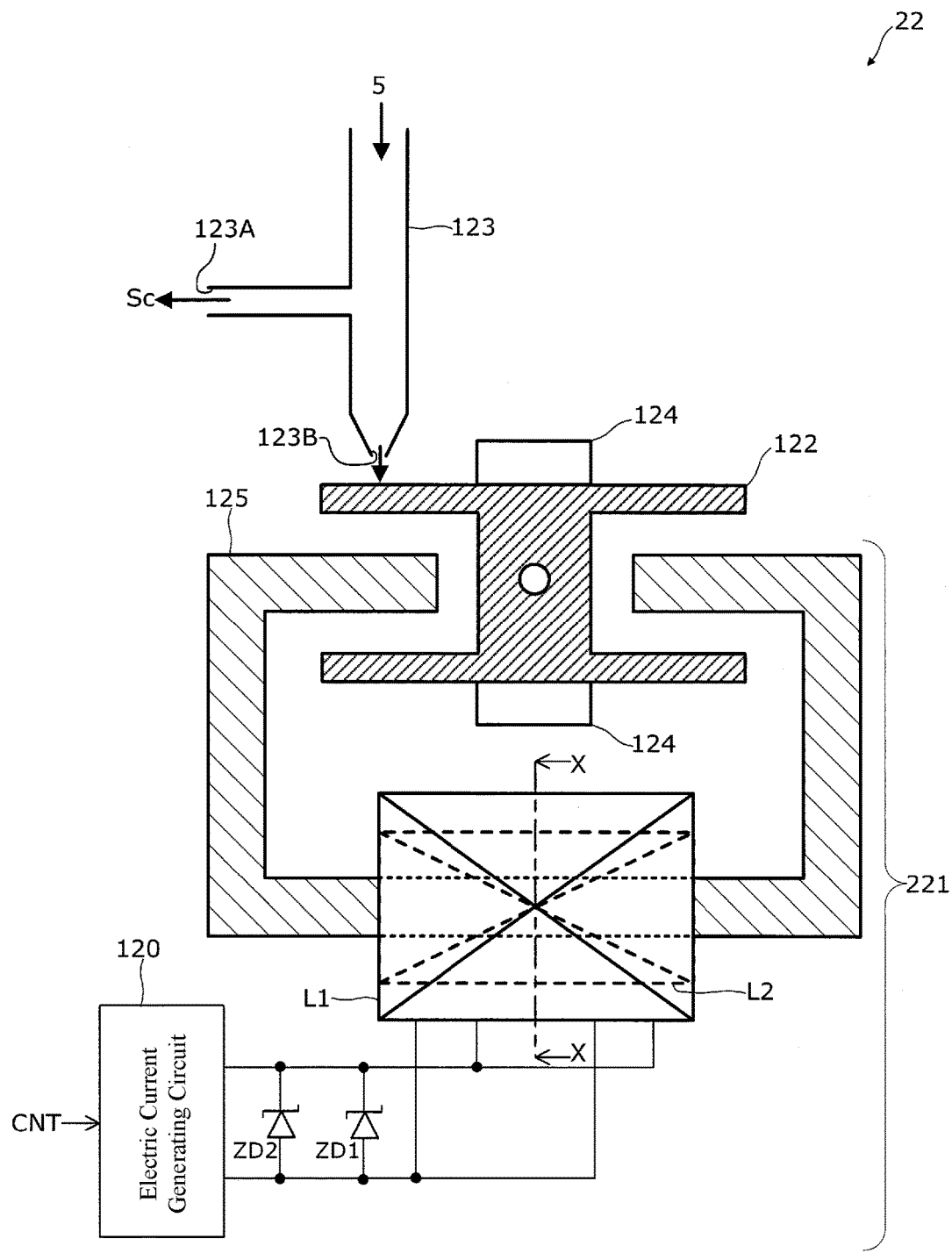
FIG. 8 is a diagram illustrating schematically the structure of an electropneumatic converting portion in a positioner according to another example.

FIG. 8 is a diagram illustrating schematically the structure of an electropneumatic converting portion in a positioner according to another example.

The electropneumatic converting portion 22 illustrated in FIG. 8 differs from the electropneumatic converting portion 12 according to the first example in the point that the two coils that structure the magnetism generating portion are disposed concentrically, and in the other points it is identical to the electropneumatic converting portion 12 according to the above example. Note that in FIG. 8 identical reference symbols are assigned to those structural elements that are identical to those in the electropneumatic converting portion 12 in the above example, and detailed explanations thereof are omitted.

Figure 9:
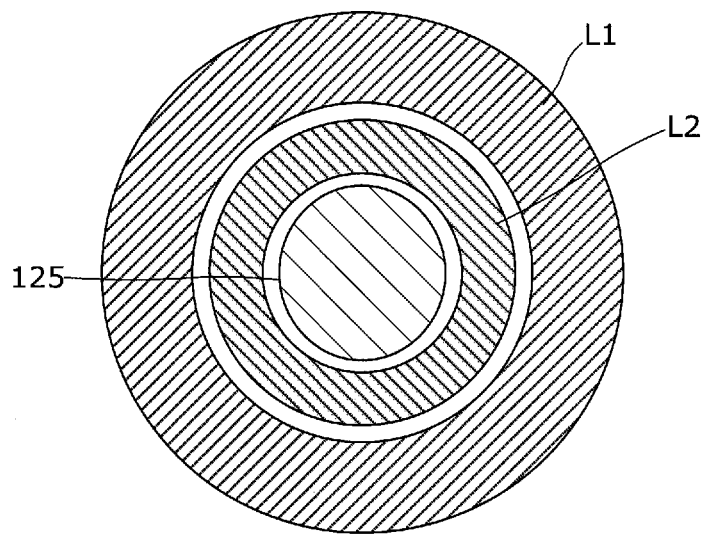
FIG. 9 is a diagram illustrating the positional relationships of the individual coils in the electropneumatic converting portion in the positioner according to another example.

FIG. 9 is a diagram illustrating the positional relationship between the coil L1 and the coil L2 in an electropneumatic converting portion 22 according to the other example. In this figure, the cross-sections of the coils L1 and L2 along X-X in FIG. 8 are shown schematically, that is, the cross-sectional shapes of the coils L1 and L2 when cut in the direction perpendicular to the axis of the coils L1 and L2 (the direction through which the core 125 passes) are shown.

As illustrated in FIG. 9, the coil L1 and the coil L2 in the magnetism generating portion 221 are disposed concentrically. Specifically, the cylindrical coil L2 is inserted in the axial direction of the coil L1, within a cylindrical coil L1, arranged so that the coil L1 and the coil L2 are coaxial. Moreover, the core 125 is arranged passing through the interior of the coil L2, in the axial direction of the coils L1 and L2. Note that the electrical connection relationship between the coil L1 and the coil L2 is the same as that in the above example (referencing FIG. 6).

As described above, dividing, into the coil L1 and the coil L2, the coil that structures the magnetism generating portion, in the same manner as with the positioner according to the above example, enables an increase in the freedom of design of the electrical circuitry within the positioner while satisfying the conditions for the intrinsically safe anti-explosive structure.

Moreover, disposing the coil L1 and the coil L2 concentrically, as described above, enables a further reduction in the space occupied by the coils L1 and L2 within the positioner, enabling a further miniaturization of the positioner.

Figure 10:
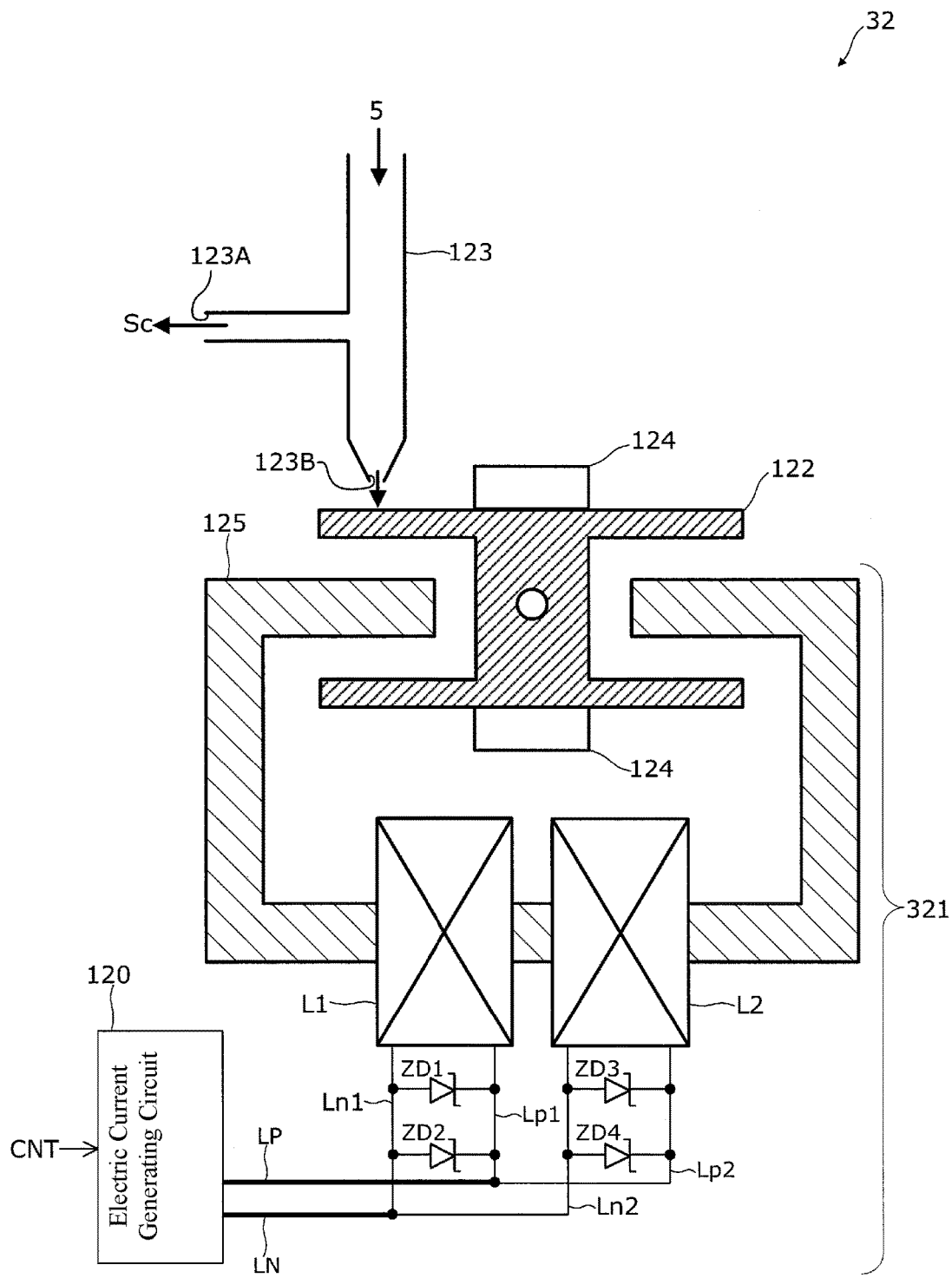
FIG. 10 is a diagram illustrating schematically the structure of an electropneumatic converting portion in a positioner according to a further example.

FIG. 10 is a diagram illustrating schematically the structure of an electropneumatic converting portion in a positioner according to a further example.

The electropneumatic converting portion 32 illustrated in FIG. 10 differs from the electropneumatic converting portion 12 according to the previous example in the point that the interconnections for supplying current to the coils from the current generating circuit branch plurally, and a coil and a Zener diode are combined with each branch interconnection.

Figure 11:
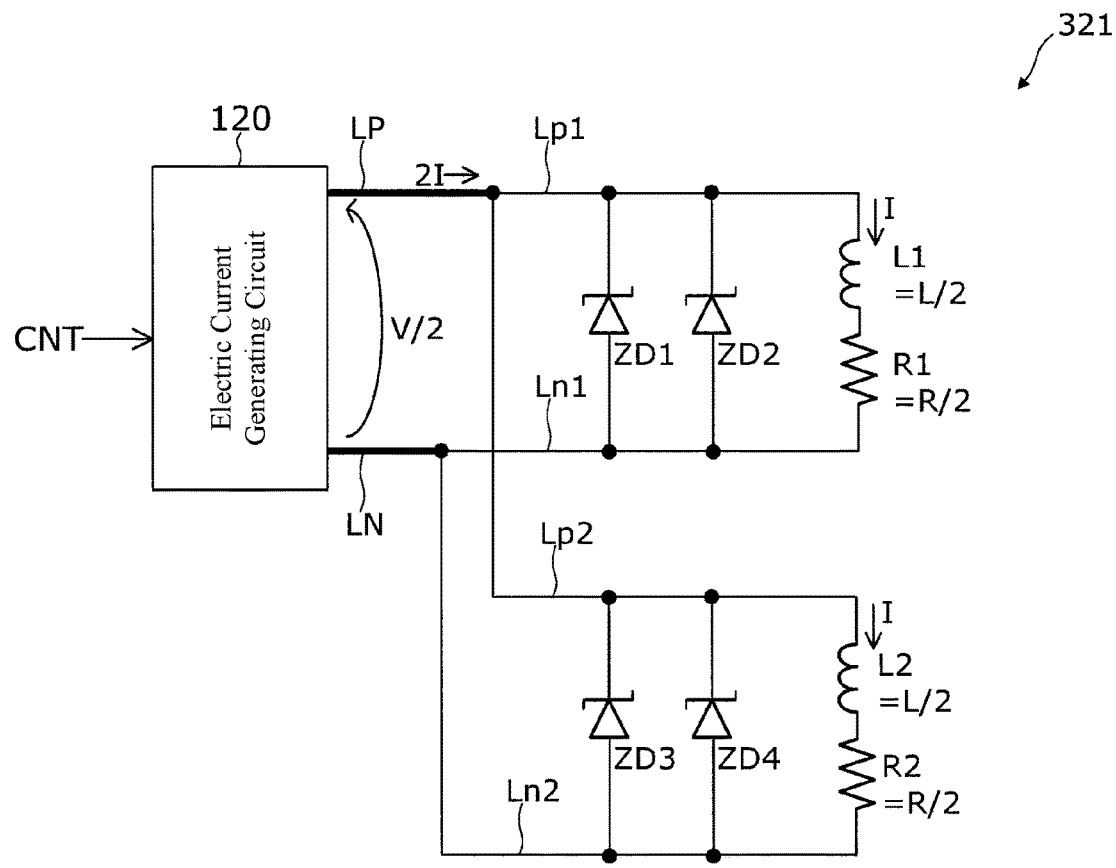
FIG. 11 is a diagram illustrating the electrical connection relationships of the individual coils in the electropneumatic converting portion in the positioner according to the further example.

The electrical connection relationships between the coils L1 and L2 in the electropneumatic converting portion 32 are illustrated in FIG. 11.

As illustrated in this figure, the current generating circuit 120 and the coils L1 and L2 are connected by the main interconnections LP and LN that are supplied electric current from the current generating circuit 20, the branch interconnections Lp1 and Lp2 that branch from the main interconnection LP, and the branch interconnections Ln1 and Ln2 that branch from the main interconnection LN.

The coil L1 and the Zener diodes ZD1 and ZD2 are connected between the branch interconnection Lp1 and the branch interconnection Ln1. Moreover, the coil L2 and the Zener diodes ZD3 and ZD4 are connected between the branch interconnection Lp2 and the branch interconnection Ln2.

Here let us consider a case wherein the same magnetic flux φ as in the conventional magnetism generating portion 521, illustrated in FIG. 7, is to be produced in the magnetism generating portion 321 illustrated in FIG. 11.

In FIG. 11, when, in the same manner as with the magnetism generating portion 121 according to the first example, the inductances of the coils L1 and L2 are both "L/2," and the current of "2I" is supplied from the current generating circuit 120 to the main interconnections LP and LN, the magnetic flux φ that is produced by the magnetism generating portion 321 is expressed by "φ=φ1+φ2=LI/2+LI/2=LI," in the same way as with the magnetism generating portion 121 according to the above example.

Moreover, the voltage V1 across the Zener diodes ZD1 and ZD2 and the voltage V2 across the Zener diodes ZD3 and ZD4 are expressed by "V1=V2=RI/2," the same as for the magnetism generating portion 121 according to the first example. Moreover, the energy E1 that is stored in the coil L1 is expressed by "E1=½×LI²/2=LI²/4," and the energy E2 that is stored in the coil L2 is expressed by "E2=½×LI²/2=LI²/4."

Here the coil L1 and the coil L2 are connected not to common interconnections, as described above, but rather respectively to the branch interconnections Lp1 and Ln1 and the branch connections Lp2 and Ln2 that branch from the main interconnections LP and LN. Moreover, the Zener diodes ZD1 and ZD2, and the Zener diodes ZD3 and ZD4, are connected to the individual branch interconnections that are connected to the coils L1 and L2.

Consequently, the Zener diodes ZD1 and ZD2 that are connected to the branch interconnections Lp1 and Ln1 should have Zener voltages that are greater than "V=RI/2," and should have electric power ratings enough to absorb the amount of energy E1 (=LI²/4=E0/2) when the energy E1 is released from the coil L1 when there is a fault in the positioner. Similarly, the Zener diodes ZD3 and ZD4 that are connected to the branch interconnections Lp2 and Ln2 should have Zener voltages that are greater than "V=RI/2," and should have electric power ratings enough to absorb the amount of energy E2 (=LI²/4=E0/2) when the energy E2 is released from the coil L2 when there is a fault in the positioner. That is, the coil energy that must be absorbed by a single Zener diode is half the coil energy that must be absorbed by the Zener diodes in the conventional magnetism generating portion 521.

As described above, having the interconnections for supplying the excitation currents to the coils the branched plurally and connecting a set of a coil and Zener diodes to each individual branch interconnection cuts in half the coil energy that must be absorbed by the Zener diode, when compared to that in a conventional positioner, making it possible to reduce the electric power rating required in each individual Zener diode. Specifically, it is possible to use, for the Zener diodes ZD1, ZD2, ZD3, and ZD4 in the magnetism generating portion 321, elements with smaller electric power ratings than those of the Zener diodes ZDa and ZDb in the conventional magnetism generating portion 521. This increases the scope over which the Zener diodes can be selected, and contributes to a reduction in the manufacturing cost of the positioner.

While the invention created by the present inventors has been explained in specifics above based on examples, the present disclosure is not limited thereto, but rather may of course be modified in a variety of ways in a scope that does not deviate from the spirit or intent thereof.

For example, while cases wherein the coil for structuring the magnetism generating portions were divided into two coils, the coil L1 and the coil L2, in the numerous examples, the number of coils for the division is not limited thereto. For example, the coil may be divided into three or more coils.

Moreover, while the example illustrated a case wherein the coil L1 and the coil L2 were arranged in parallel, there is no limitation to the example described above, insofar as the coil L1 and the coil L2 are arranged so as to be additively coupled.

Moreover, while the further example illustrated a case wherein the coil L1 and the coil L2 had a common core 125 passed therethrough, and were mutually separated from each other in the direction in which the core 125 extended, the coil L1 and the coil L2 may instead be arranged concentrically, as illustrated in the other example.

I claim:

1. A positioner, comprising:
an air circuit comprising a magnetism generator that generates magnetism based on an electric current in accordance with a difference between a valve opening setpoint for a regulator valve that is to be controlled and a measured valve opening value for the regulator valve, the air circuit generating a pneumatic signal adjust air pressure
wherein the pneumatic signal is generated based on the magnetism produced by the magnetism generator, and is supplied to an operating device of the regulator valve, and
the magnetism generator includes a plurality of separate coils that are connected in parallel electrically and that are additively coupled magnetically, wherein the magnetism generator further comprises:
a main interconnection to supply the electric current;
a plurality of branch interconnections, provided for each of the plurality of coils, branching from the main interconnection; and
a plurality of Zener diodes, provided for each of the plurality of coils, wherein a corresponding coil and corresponding Zener diodes are connected in parallel with each of the branch interconnections.

2. The positioner as set forth in claim 1, wherein the magnetism generator further comprises a core that passes through the plurality of coils; and
the plurality of coils are disposed separated from each other in a direction in which the core extends.

3. The positioner as set forth in claim 1, wherein the plurality of coils are arranged in a form of concentric circles.

4. The positioner of claim 1, wherein the magnetism generator includes two separate coils having identical series resistances based on the resistance components of windings of the separate coils.

* * * * *